INVENTORS
CLAUDE J.P.F. LE CAN
PETRUS A.M. HOSPEL
BY
Frank R. Jifani
AGENT

INVENTORS
CLAUDE J.P.F. LE CAN
PETRUS A.M. HOSPEL
BY
Frank R. Trifari
AGENT

INVENTORS
CLAUDE J.P.F. LE CAN
PETRUS A.M. HOSPEL
BY
Frank R. Jerifari
AGENT

United States Patent Office 3,268,781
Patented August 23, 1966

3,268,781

P-N JUNCTION TRANSISTOR WITH INCREASED RESISTANCE IN CURRENT PATH ACROSS BASE SURFACE

Claude Jan Principe Frederic Le Can and Petrus Albertus Maria Hospel, Mollenhutseweg, Nijmegen, Netherlands, assignors to North American Philips Company, Inc., New York, N.Y., a corporation of Delaware Filed Aug. 23, 1962, Ser. No. 218,930
Claims priority, application Netherlands, Aug. 28, 1961, 268,692
5 Claims. (Cl. 317—235)

The invention relates to a junction transistor and to a method of manufacturing such a transistor which comprises a semi-conductor body in which a thin base layer is sandwiched between two semi-conductive parts of the p-conductivity type which form an emitter and a collector respectively, the part of the base layer appearing at the surface of the transistor being of the same order of thickness as the part of the base layer sandwiched between the emitter and the collector.

Transistors are known in which this configuration is obtained by pulling a semi-conductor crystal from a melt, the temperature, the pulling rate and/or the composition of the melt being controlled so that the said thin base layer is produced between the emitter and the collector. A very suitable method of obtaining this configuration is that in which there is alloyed to a semi-conductor body of the p-conductivity type an alloy containing donors and acceptors which are chosen so that the diffusion rate of the donors exceeds that of the acceptors and that the segregation constant of the acceptors exceeds that of the donors, the arrangement being such that under the alloy a thin n-type base layer is produced by diffusion while a p-type emitter layer is produced thereon by segregation. Such transistors are to be distinguished from transistors in which only between the emitter and the collector the base layer has a thin part which is encircled by thick marginal parts. The latter transistors may, for example, be obtained by alloying to opposite faces of a semi-conductor body an emitter and a collector respectively or by producing cavities in opposite faces of such a body by etching and subsequently providing electrodes in these cavities by electrodeposition.

The invention does not relate to such transistors in which the part of the base layer appearing at the surface is far thicker than the part sandwiched between the emitter and the collector.

The invention relates particularly to germanium transistors.

In transistors in which the part of the base layer appearing at the surface is very thin, instabilities may occur especially if the transistors are used for switching purposes. For switching purposes the emitter and base electrodes may serve as the input terminals, while the collector and base electrodes may serve as the output terminals. In case of a p-n-p transistor, for instance, the emitter for instance being grounded and the collector voltage being negative, the transistor is in the non-conductive condition for positive base voltages and assumes the conductive condition when the base voltage becomes negative. When such transistors are in the non-conductive condition and voltage fluctuations not exceeding a few volts occur in the control voltage base to emitter voltage, the control voltage yet remaining positive, no collector current (output current) should be expected; however unexpected current may be passed for short periods of time with resulting unintentional switching effects. Such voltage fluctuations may occur for instance in a practical computer circuit due to unwanted changes in the input gating of the computer circuit. The voltages at which the said unintentional switching effects occur are far smaller than the voltages at which breakdown occurs between the emitter and the collector across the part of the thin base zone appearing at the surface. A possible explanation of the said effects is that an inversion layer is produced on the superficial part of the base layer, the conductivity of the said inversion layer depending upon the voltage between the emitter and the base and in the event of voltage variations reaching its equilibrium condition comparatively slowly.

It is an object of the present invention to reduce the likelihood of such instabilities.

According to the invention, the superficial part of the base layer has a marginal zone which is thinner than the adjoining part of the base layer and bears on one of the two adjoining p-type parts.

By this step the path between the emitter and the collector measured along the superficial part of the base layer becomes, for instance, at least 1.5 times, preferably at least 3 times, longer than the spacing between the emitter and the collector measured directly.

The superficial part of the base layer need not have such a marginal zone throughout its entire length. Such a continuous marginal zone may be dispensed with particularly in some types of transistors in which the base layer has parts appearing at the surface at parts spaced from the emitter by comparatively large distances. The said parts of the base zone are not likely to cause instabilities.

The marginal zone rests preferably upon the adjoining part forming the emitter, because the presence of this zone brings about a slight increase of the capacitance between the base layer and the parts supporting the marginal zone. In transistors of the kind under consideration the capacitance between the base layer and the collector is preferably maintained at a minimum.

In one of the embodiments of the transistor in accordance with the invention, the marginal zone is separated by a groove from the other adjoining part of the base layer not supporting the marginal zone. In this connection it should be remarked that the provision of a groove, for example, by etching at the point at which a p-n-junction in a semi-condutocr body appears at the surface is known. However, in this method the spacing between the adjoining parts, measured along the surface, does not become greater.

The thickness of the base layer preferably is at most 1 micron.

The method of manufacturing such a transistor is characterized in that a semi-conductor body in which a n-type base layer is sandwiched between two adjoining p-type semi-conductive parts and the part of the base layer appearing at the surface is of the same order of thickness as the part of the base layer sandwiched between the adjoining parts, is etched electrolytically, at least one of the parts of the body being connected to the positive terminal of a current supply source, the negative terminal of which is connected to a cathode disposed in the electrolyte, while across one of the p-n-junctions between the base layer and one of the adjoining parts a potential difference is maintained in the reverse direction.

The statement that one of the parts of the semi-conductor body is connected to the positive terminal of a current supply source includes the case where at least one circuit element, for example, a limiting resistor, is included in the connection. Although in this specification the base layer is generally referred to as such, it is to be considered as one of the parts of the body.

The said method is based on the recognition of the fact that the said potential difference causes the depletion layer of the minority carriers near the said junction to extend into the base layer so that the superficial part of the base layer containing the depletion layer is only slightly attacked by the electrolyte. The said potential difference preferably has a value of from 1 to 5 volts.

The potential difference may be maintained by a separate current supply source.

However, preferably one of the p-type parts adjoining the base layer is electrically connected to the cathode disposed in the electrolyte and to the negative terminal of the current supply source, the positive terminal of which is connected through a limiting resistor to the base layer, the arrangement being such that there is set up between the said p-type part and the base layer a voltage in the reverse direction equal to the voltage of the current supply source minus the voltage set up across the series resistor. Thus a single current supply source is sufficient, while during the etching process only two connections need be provided on the transistor. This method is preferably employed in a transistor the emitter of which contains both donors and acceptors and the base layer of which is produced by diffusion, because in such transistors the base layer is particularly thin.

The invention is particularly employed in transistors in which the electrolytic etching process is performed after an area of the surface of the semi-conductor body adjoining the emitter is coated with a resist in order to protect it against attack by the electrolyte while another area, which extends to the emitter, is removed by etching. In the said methods the capacitors between the emitter and the base layer is reduced to a minimum, which is an advantage, but the path between the emitter and the collector measured along the surface of the base becomes particularly short so that in transistors so manufactured instabilities are likely to occur.

In order that the invention may readily be carried into effect, embodiments thereof will now be described, by way of example, with reference to the accompanying diagrammatic drawings, in which.

Figures 1, 2:
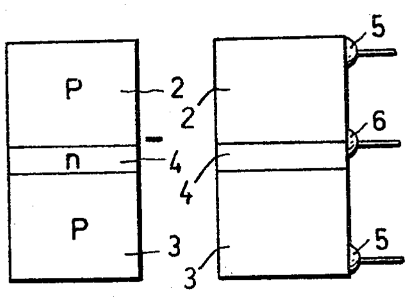
FIGURES 1, 2, 4 and 5 show diagrammatically a junction transistor obtained by a process of pulling from a melt in various stages of manufacture.

FIGURE 1 shows a semi-conductor body 1 comprising two p-type parts 2 and 3 between which a thin n-type base layer 4 is sandwiched. The thickness of this layer may, for example, be 5 microns. Such a body may be cut from a bar which is made by pulling from a melt and in which at least one such thin n-type layer is provided by variation of the doping of the melt and/or of the rate of pulling. Contacts 5 having acceptor properties are provided on the parts 2 and 3 and a contact 6 having donor properties is provided on the layer 4 (FIGURE 2). Because the layer 4 is extremely thin, the contact 6 will generally be broader. Thus it bears partly on the p-type part 2. Owing to the donor properties of the contact 6 the material of the part 2 adjoining the contact will become of n-type and, considered electrically, will be integral with the base layer 4.

Figure 3:
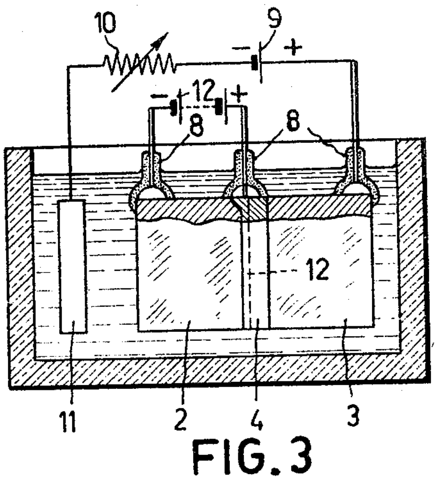
FIGURE 3 shows diagrammatically an arrangement for etching the said transistor.

The manner in which such a body is manufactured and the contacts are provided is known and no essential feature of the invention. After the contacts have been coated with layers 8 of a wax resist, the assembly is immersed in a 30% solution of potassium hydroxide and the part 3 is connected to the positive terminal of a current supply source 9. The negative terminal is connected through a limiting resistor 10 to a cathode 11 suspended in the bath (FIGURE 3).

During this treatment the p-n-junction between the parts 3 and 4 is connected in the forward direction. As is known the n-type part 4 is preferentially removed by etching.

Figure 4:
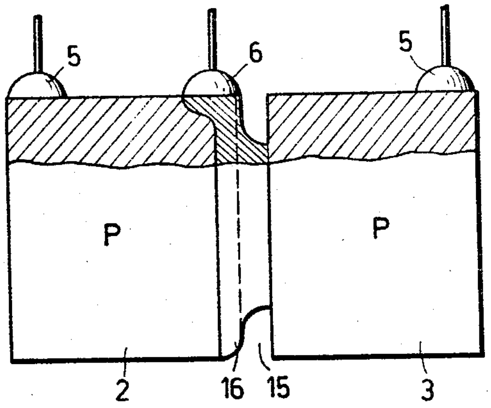

However, there is connected between the supply leads 5 and 6 provided on the parts 2 and 4 a second current supply source 12 which biases the p-n-junction between the said parts in the reverse direction. As a result the depletion layer of the minority carriers near the said junction in the n-type part 4 spreads to an extent indicated by a broken line 12. This part of the base layer 4 is little or not attacked by the etching liquid so that at the area at which the n-type base layer appears at the surface a groove 15 is produced adjacent the part 3 whereas the marginal zone 16 is left on the part 2 (FIGURE 4).

Figure 5:
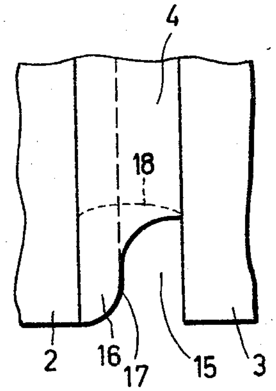

If, now, such a device is used as a transistor in which the part 2 forms the emitter and the part 3 the collector, it will be appreciated that the path between these parts across the surface of the base layer 4 has become longer than the spacing between the emitter and the collector measured directly. The first mentioned path along the surface is designated 17 in FIGURE 5, which is drawn to an enlarged scale. If the semi-conductor body should have been etched in the usual manner without creating a depletion layer 12, a wide groove would have been produced in the base layer boundary of which is denoted 18 in FIGURE 5. In this event the path from the emitter to the base across the semi-conductive surface is the shorter by far as compared with the path across the said semi-conductive surface 17.

As a second example, the manufacture of an alloy-diffusion transistor intended for switching purposes will now be described.

Figure 6:
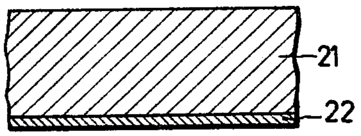
FIGURES 6 to 11, 13 and 14 show schematically various stages of the manufacture of an alloy-diffusion transistor.
Figure 7:
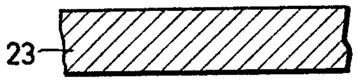

The initial material is, for example, a wafer 21 of p-type germanium (FIGURE 6) having a thickness of 200 microns and a specific resistivity of 1 ohm-cm. On one face a layer of gold 22 from 0.3 to 0.4 micron thick is deposited from vapour and subsequently the gold is diffused into the material of the wafer by heating to 800° C. in hydrogen for 4 hours. In this treatment the gold layer 22 alloys with the germanium and partly disappears by diffusion. Alternatively a wafer may be used which is cut from a germanium body which has been doped with a "killer" such as gold. Subsequently the upper part of the wafer is removed by etching to a depth of 100 microns in order to eliminate any surface impurities (FIGURE 7).

On the resulting wafer, which now is designated 23, two amounts of contact material are placed which have the form of pellets with a diameter of 150 microns and are spaced 40 microns apart. The pellets consist of an alloy of lead containing 5% by weight of antimony and about 1% by weight of aluminum and of an alloy of lead containing 5% by weight of antimony but no aluminum, respectively.

Figure 8:
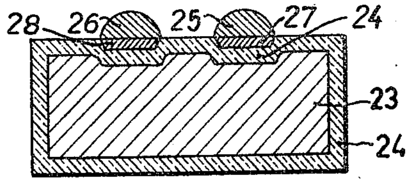

By heat treatment in hydrogen at a temperature of about 750° C. for 6 minutes the contact material is alloyed to the wafer (FIGURE 8). In the treatment the antimony diffuses from the contact material into the surface of the p-type wafer in which it forms a base layer 24 about 1 micron thick. This layer 24 covers the entire wafer 23 and continues under contacts 25 and 26 produced in the said process, as is shown to an enlarged scale in FIGURE 8. During the alloying process germanium is dissolved in the contact material but segregates again during cooling to form two layers 27 and 28 under the contacts 25 and 26, the first layer 27 being of n-type conductivity owing to its content of antimony while the second layer 28 is of p-type conductivity owing to the high solubility of aluminum in germanium. Thus the layer 28 forms the emitter while the parts 24 and 27 form the base layer. The part 23 is intended as the collector. During the diffusion process a small amount of gold moves from the proximity of the contacts in a direction opposite to that of the diffusion antimony so that the adverse influence of this "killer" in the base layer is reduced. When the layer 24 has been removed from the lower surface of the wafer 23, for example, by etching, the wafer is soldered to a collector contact 29 with the aid of an indium-gallium alloy.

Figure 9:
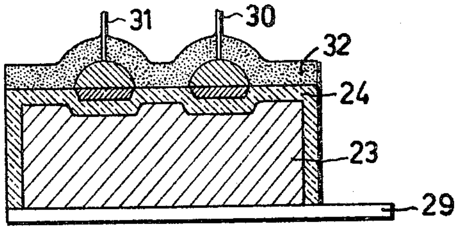
Figure 10:
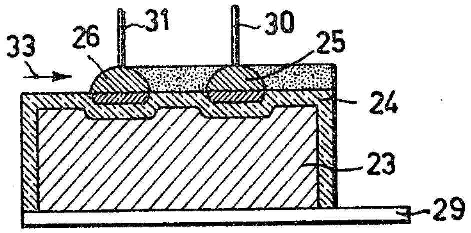
Figure 11:
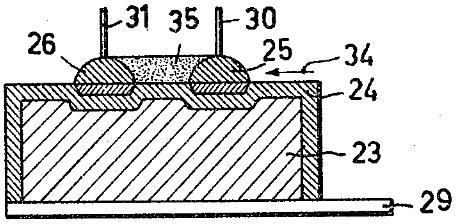

Subsequently two supply leads 30 and 31 are soldered to the contacts 25 and 26 and the assembly is coated with a lacquer resist 32 (FIGURE 9). This lacquer is then removed from the entire semi-conductor surface with the exception of the part between the contacts 25 and 26. This may be effected, as is shown diagrammatically in FIGURES 10 and 11, by atomizing a solvent for the lacquer, for example, acetone, the jet being directed onto the contacts first in the direction indicated by the arrow 33 and then in the direction indicated by the arrow 34. Thus, only the part 35 of the lacquer between the contacts 25 and 26 is inaccessible to the solvent.

A characteristic feature of the resulting resist coating 35 is that the greater part of the surface of the contacts 25 and 26 and the base layer 24 is left uncovered.

Figure 12:
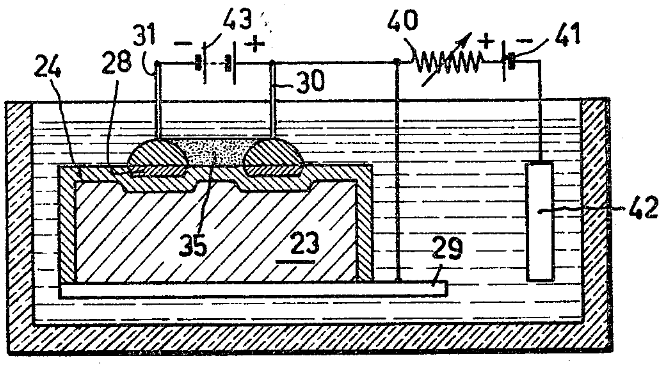
FIGURES 12 and 15 show arrangements for etching such a transistor.

The semi-conductor body is now subjected to an etching treatment, which may again be performed in a 30% solution of potassium hydroxide in water, the base lead 30 and the collector contact 29 being connected to one another and, through a limiting resistor 40, to the positive terminal of a current supply source 41. The voltage of the current supply source may be about 2 volts. The negative terminal is connected to a cathode 42 (FIGURE 12). A current supply source 43 is connected between the emitter and the base lead so as to load the junction layer between the p-type emitter 28 and the base layer 24 in the reverse direction. The voltage of the second current supply source may be about 3 volts. The parts of the leads immersed in the electrolyte are protected by a coating of resist, not shown. The etching time may be some minutes.

As a result of this treatment the n-type base layer 24 is removed by etching with the exception of the parts coated by the resist 35 and along the edge of the emitter 28 where a depletion layer has been formed owing to the voltage source 43. Finally the resist coating 35 is dissolved in acetone.

Figure 13:
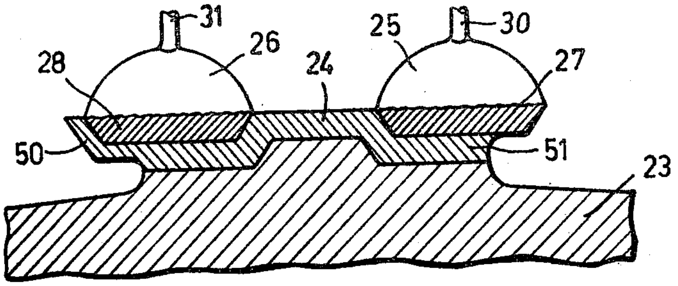
Figure 14:
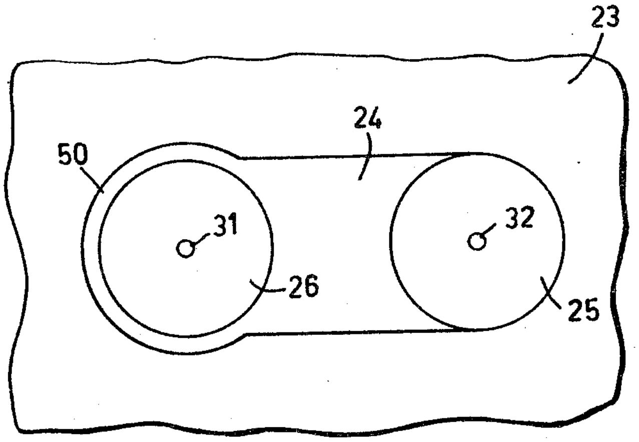

FIGURES 13 and 14 show the most important parts of the resulting transistor to an enlarged scale.

The marginal zone of the base layer 24 is designated by 50. This marginal zone rests upon the p-type part 28. The thickness of the marginal zone is shown exaggerated for the sake of clarity but in actual fact it is of the order of 0.1 micron. The marginal zone is produced only in the region in which the depletion layer has exerted its influence during the etching treatment, that is to say under the emitter contact 26, no marginal zone being produced near the part of the base layer 24 designated by 51.

Figure 15:
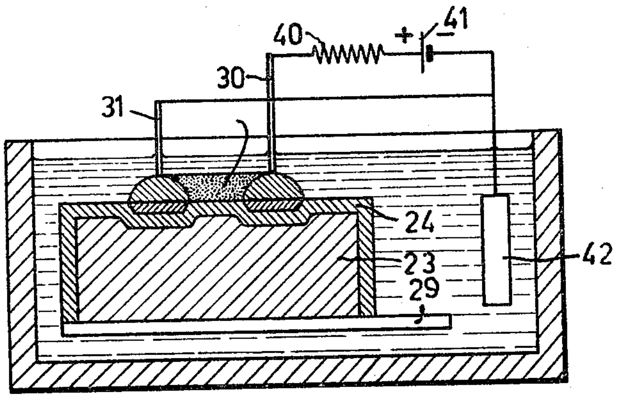

FIGURE 15 finally shows a simplified arrangement for etching such transistors. This arrangement is distinguished from that shown in FIGURE 12 in that the end of the limiting resistor 40 not connected to the current supply source 41 is connected only to the base lead 30 and not to the collector contact 29. The emitter lead 31 is directly connected to the negative terminal of the current supply source 41. If the voltage of the current supply source is, for example, 3.5 volts and the potential difference in the resistor is 1.5 volts, a voltage of 2 volts is set up in the reverse direction across the p-n-junction between the emitter and the base layer.

What is claimed is:

1. A junction transistor comprising a semiconductive body with emitter and collector zones of one type conductivity, a base zone of the opposite conductivity type sandwiched between them and extending to the surface of the semiconductive body, the base zone having a surface portion with a thickness dimension, separating the adjacent emitter and collector zones, that is of approximately the same thickness as that of the interior base zone portions, a portion of the base zone at the surface having a region which is thinner than the adjacent interior portion of the base zone and forming a current path between the emitter and collector zones, along the surface of the base zone, that is substantially longer than the spacing between them, and said thinner region of the base zone being contiguous with one of the emitter and collector zones.

2. A transistor as set forth in claim 1 wherein the semiconductive body is of germanium.

3. A p-n-p junction transistor comprising a semiconductive body with emitter and collector zone of p-type conductivity, a base zone of n-type conductivity sandwiched between them and extending to the surface of the semiconductive body, the base zone having a surface portion with a thickness dimension, separating the adjacent emitter and collector zones, that is of approximately the same thickness as that of the interior base zone portions, the portion of the base zone at the surface and near the emitter having a region which is thinner than the adjacent interior portion of the base zone and forming a current path between the emitter and collector zones, along the surface of the base zone that is substantially longer than the spacing between them, and said thinner region of the base zone being contiguous with the emitter zone.

4. A transistor as set forth in claim 3 wherein the interior portions of the base zone have a thickness below 2 microns, and the current path along the surface is at least 1.5 times the spacing between the emitter and collector zones.

5. A p-n-p, germanium junction transistor comprising a semiconductive body with emitter and collector zones of p-type conductivity, a base zone of the n-type conductivity sandwiched between them and extending to the surface of the semiconductive body, the base zone having a surface portion with a thickness dimension, separating the adjacent emitter and collector zones, that is of substantially the same thickness as that of the interior base zone portions, the portion of the base zone at the surface adjacent the collector zone being cut-away to form a region adjacent the emitter which is thinner than the adjacent interior portion of the base zone and forming a current path between the emitter and collector zones, along the surface of the base zone, that is at least three times longer than the spacing between them, and said thinner region of the base zone being contiguous with the emitter zone.

References Cited by the Examiner

UNITED STATES PATENTS

| | | | |
|---|---|---|---|
| 2,864,006 | 12/1958 | Vandeven | 317—235 X |
| 2,971,140 | 2/1961 | Chappey et al. | 317—235 |
| 2,982,893 | 5/1961 | Spanos | 317—235 |
| 3,078,219 | 2/1963 | Chang | 204—143 |
| 3,085,055 | 4/1963 | Bradley | 204—143 |

JOHN W. HUCKERT, *Primary Examiner.*

JAMES D. KALLAM, C. E. PUGH, *Assistant Examiners.*